(No Model.) 3 Sheets—Sheet 1.
A. E. KENNELLY.
STATIC VOLTMETER.
No. 500,236. Patented June 27, 1893.
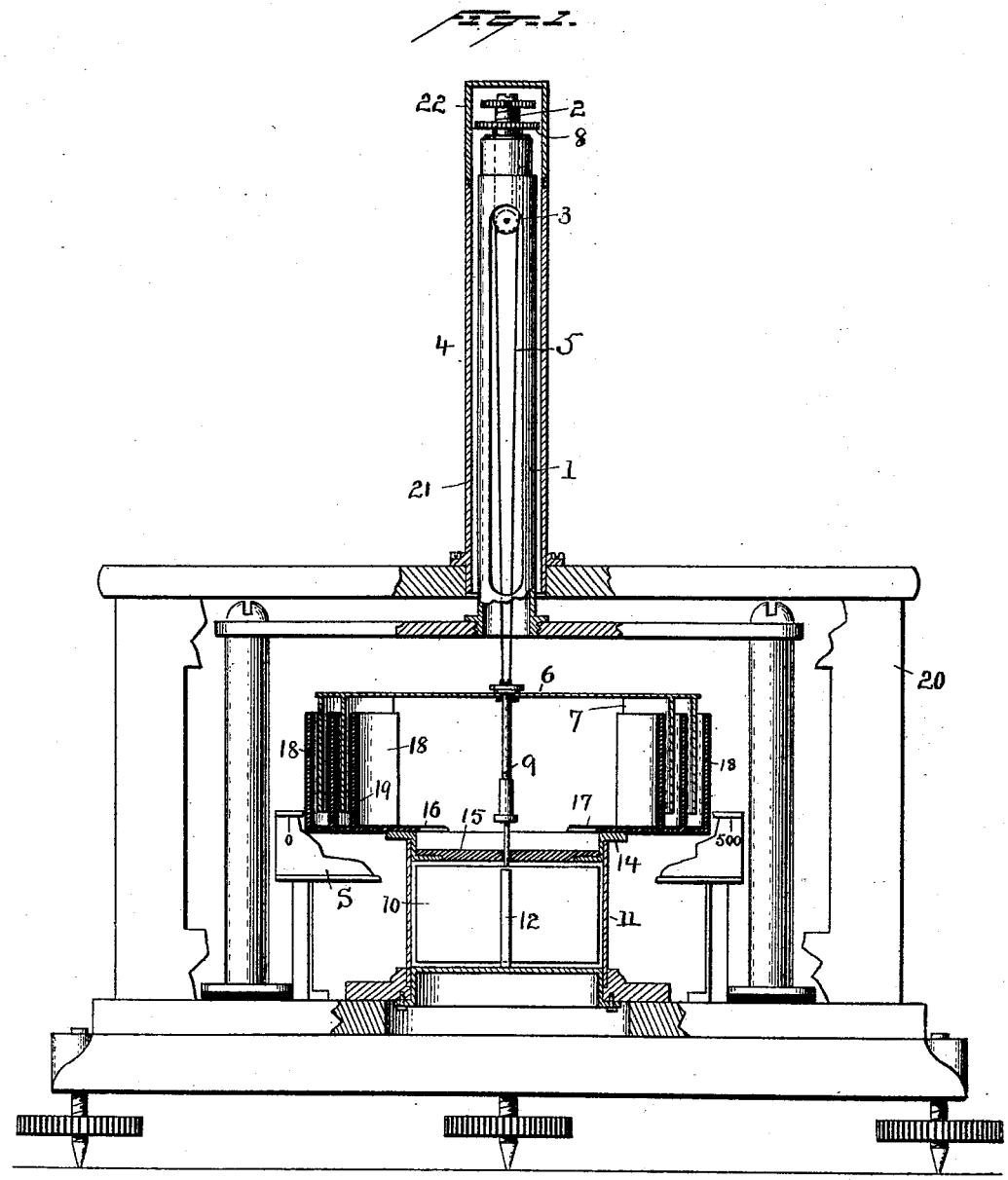
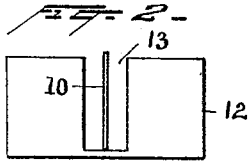
WITNESSES:
Norris H. Clark.
George B. Crouk.
INVENTOR
A. E. Kennelly
BY
Dyer & Seely
ATTORNEYS (No Model.) 3 Sheets—Sheet 2.
A. E. KENNELLY.
STATIC VOLTMETER.
No. 500,236. Patented June 27, 1893.
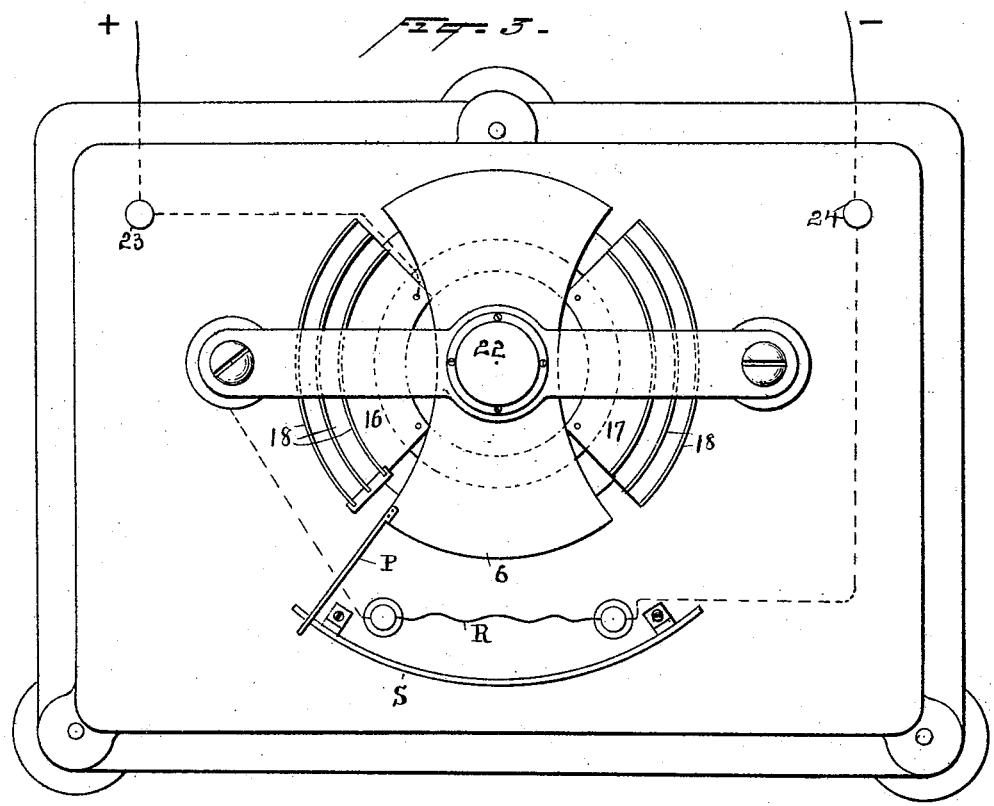
WITNESSES:
Norris A. Clark.
George B. Crouk.
INVENTOR
A. E. Kennelly.
BY
Dyer & Seely.
ATTORNEYS (No Model.) 3 Sheets—Sheet 3.
A. E. KENNELLY.
STATIC VOLTMETER.
No. 500,236. Patented June 27, 1893.
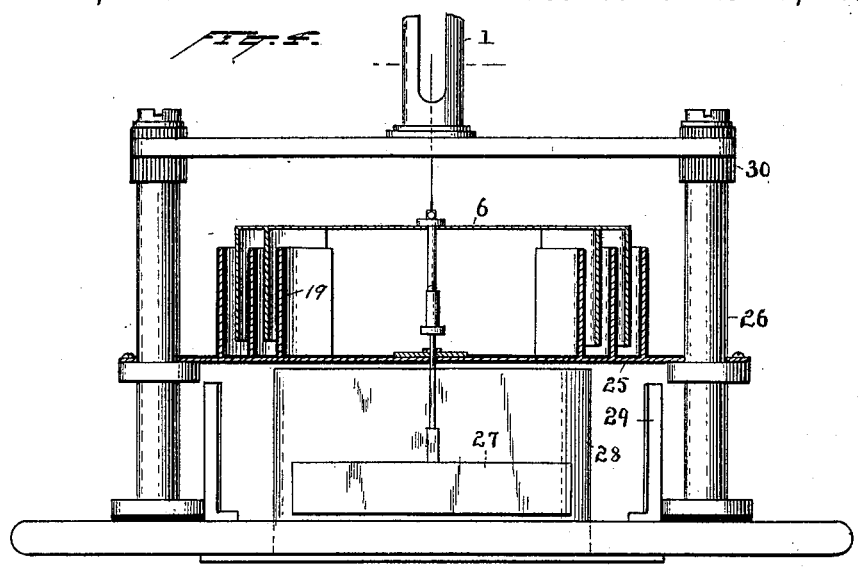
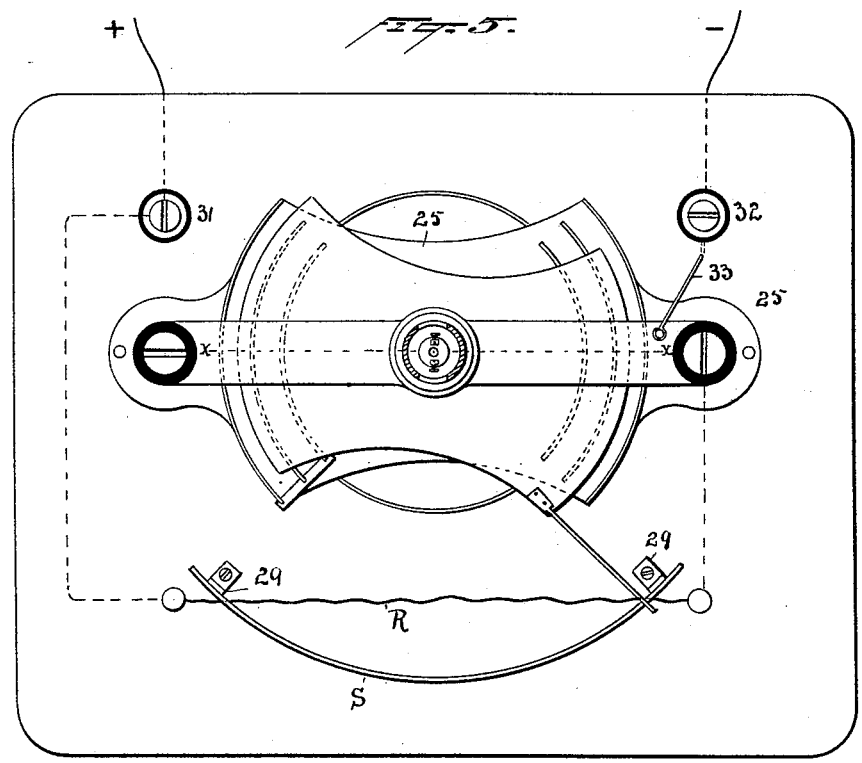
Witnesses
Norris A Clark.
George E. Crook.
Inventor
A. E. Kennelly
By his Attorneys
Ayer & Seely.

UNITED STATES PATENT OFFICE.

ARTHUR E. KENNELLY, OF ORANGE, NEW JERSEY, ASSIGNOR TO THOMAS A. EDISON, OF SAME PLACE.

STATIC VOLTMETER.

SPECIFICATION forming part of Letters Patent No. 500,236, dated June 27, 1893.

Application filed August 6, 1892. Serial No. 442,361. (No model.)

*To all whom it may concern:*

Be it known that I, ARTHUR E. KENNELLY, a subject of the Queen of Great Britain, residing at Orange, in the county of Essex and State of New Jersey, have invented a certain new and useful Improvement in Static Voltmeters, of which the following is a specification.

The invention relates to volt meters operated by the attractive force of electro static charges given to suitable parts of the instrument by connection with a circuit, and the invention consists mainly in a meter of the character indicated, having a movable needle or member with a bifilar conducting suspension, and in certain improvements in the construction of the needle or movable member and in the co-operating actuating member.

The invention consists also in certain additional combinations and features hereinafter more fully set forth and pointed out in the claims.

In the accompanying drawings, Figure 1 is a view, partly in section, of one form of my volt meter, the parts being broken away on a line corresponding to line $x-x$ of Fig. 5. Fig. 2 is a view, at right-angles to Fig. 1, of a part of the needle regulating or retarding device. Fig. 3 is a plan view of the meter shown in Fig. 1, the needle or movable member being at its normal or zero position. Fig. 4 is a view, similar to Fig. 1, of a slightly modified construction; and Fig. 5 is a plan view thereof, with the needle or movable member turned to the position which it occupies when the highest potential for which the instrument is adapted exists on the line.

In general terms, the meter in its preferred form consists of a suitable frame supporting a tube or standard 1, carrying at the upper end a holder for the bifilar needle suspension, the frame, tube and holder being electrically connected. Said holder preferably consists of a screw 2, on which is a thumb-nut 8, and which carries at its lower end a pulley 3, over which passes a fine platinum wire or other conductor forming two limbs 4, 5 supporting the needle or movable member, the lower ends being connected in any suitable manner to the plate 6, which forms the body of the needle. The connection, however, should be such that the supporting wire shall be electrically connected to said plate. Evidently it is not essential that the limbs 4, 5 should form one continuous wire, although for simplicity of arrangement this is preferred. The preferred outline of this plate is shown in Fig. 3, the ends of said plate being curved and forming arcs of a little less than ninety degrees. On the lower face of the plate 6 are soldered or riveted one or more arc-shaped metal plates 7 forming vertical extensions or vanes of the plate 6 and giving a large surface to said movable member. The plate 6 is provided with a pointer $p$, the end of which is adapted to travel over the graduated scale S as the needle is moved. Extending downward from the center of the plate 6 is a rod 9 connected to a regulating or retarding fan 10, preferably of hard rubber, in a closed chamber 11 for the purpose of retarding movements of the needle, making the meter a "dead-beat" instrument. At an angle to the fan within the chamber is placed a partition 12 which is divided by a central opening 13 through which the fan passes. Said opening is wide enough to allow the fan to be turned in either direction as far as it is intended that it should ever move before striking an edge thereof. The partition 12 is preferably made of rubber, so that there will be no attraction between it and the fan, and serves to partially confine the air in the chamber, so that an appreciable time is required to displace it by movement of the fan. On the top of the cylinder forming the chamber 11 rests a metal ring 14 supporting the rubber cover 15 and two plates 16, 17 secured thereto and in electrical connection therewith forming parts of the element herein termed the "actuating device." The preferred shape of these plates is shown in Fig. 3. Each of the plates 16, 17 is provided with one or more upwardly extending arc-shaped plates 18, three being shown, so arranged that the corresponding parts of the movable member will be adapted to move by or between them. I insulate either the needle or the actuating device by dipping the same into an insulating paint or varnish, so that all danger of cross-connection is avoided. Mica or other insulating slips may also be used. This coating is indicated by the heavy lines 19 in Fig. 1.

Over the mechanism described may be placed a cover 20, having a tube 21 adapted to surround the tube 1, and having a removable cap 22 to give access to the screw and nut by means of which the holder is regulated without removing the entire inclosing case.

The circuits of this meter are illustrated in Fig. 3, one of the wires of the circuit being connected to a suitable binding-post or terminal 23, thence to the ring 14 and the two plates 16, 17 and their vanes or extensions 18. The other wire of the circuit is connected to post or terminal 24, thence through the resistance R, (which may be of wire or of any suitable resistance material,) to one of the posts of the supporting frame, thence to the cross-bar, to the tube 1, to the holder, to the conducting wire or wires 4, 5, to the plate 6 and its extensions or vanes 7. From this it will be seen that there is no complete circuit through the meter, but that the opposite terminals are connected to the needle and to the actuating member respectively. When the meter is thus connected to a circuit, both the needle and the co-operating actuating member become electro-statically charged and mutually attract each other in such manner as to cause the needle to move the pointer over the scale to an extent dependent on the potential of the current in the circuit to which the meter is connected. Owing to the construction of the needle and of the actuating device, and owing to the fact that the needle, as well as said actuating device, is statically charged, the meter will operate in a very delicate and satisfactory manner. By constructing the needle and actuating part of bodies with several arc-shaped extensions or vanes, large surfaces are obtained without increasing the size of the instrument.

Before connecting the meter to a circuit the needle is adjusted so as to bring the pointer to the zero position on the scale. This is done by turning the screw 2, and through it the bifilar suspension wires and the needle supported thereby. The parts are preferably so adjusted that when the pointer is at the zero position the two limbs 4, 5 of the suspending wire will be straight and parallel, and as the needle moves over the scale said limbs will be twisted, slightly raising the needle and giving it a tendency to return by gravity to its zero position.

When the meter is out of use it is advisable to relieve the suspension wires from the weight of the needle. This is done by holding the screw 2 from rotation and turning the nut 8 in a direction to lower the screw, so that the weight of the needle will be borne by the rod 9 or by the needle resting on the actuating device. When the instrument is to be used, the needle is raised by turning the screw 8 in reverse direction before adjusting the pointer to the zero position.

In the modified meter shown in Figs. 4 and 5, the tube 1 is broken away and the inclosing case omitted. The section of the needle and co-operating actuating device is taken on line x—x of Fig. 5. In this meter instead of constructing the actuating device of a ring supporting two separate plates with arc extensions, I provide a single plate 25, the outline of which is shown in Fig. 5, supporting the same on the posts 26 of the frame. The actuating device is otherwise the same as above described, as also is the needle. The fan 27 in this case is in a cup 28, which is adapted to contain oil or other fluid for retarding the movements of the needle and making the meter a dead-beat instrument. 29 are the posts designed to support the graduated scale S, shown in position in Fig. 5 but which is omitted in Fig. 4. In this instrument the cross-bar is insulated at 30 from the posts of the frame. The circuit connections are as follows: One wire of the circuit is connected to the post 31, through the resistance R, to one of the posts 26, to the plate 25 and its extensions or vanes. The other wire of the circuit is connected to post 32, thence through a wire 33 to the cross-bar of the frame, to the tube 1 and to the conducting wires or strands supporting the needle in the manner already described. The operation of this meter would be precisely the same as that above described.

Evidently a needle of the construction described, and several other features of the instrument can be used to advantage sometimes with a conducting suspension not bifilar.

As above indicated, the meter described works by gravity to return the needle, rather than by torsion, as is most common in similar devices. For this reason the apparatus is more reliable, since it is not affected by changes in temperature to such an extent as are instruments depending on torsion. Also since the restituting couple in bifilar suspensions varies with the sine of the deviating angle while with the unifilar it varies as the angle itself, the sensibility of indication with the former for a given range of scale readings will be greater at the greater pressures near full load, where sensibility is most needed.

What I claim is—

1. A static volt meter having a needle or movable member, consisting of a horizontal plate or body with vanes extending therefrom, and a co-operating actuating member, which are connected to opposite terminals of the meter and which are electrically disconnected, substantially as described.

2. A static volt meter having a needle or movable member, consisting of a horizontal plate or body with vanes extending therefrom, and a co-operating actuating member with similar extensions of vanes, which are connected to opposite terminals of the meter and which are electrically disconnected, substantially as described.

3. In a static meter, the combination of a needle or movable indicating member adapted to turn and having arc-shaped vanes extending therefrom at an angle to its plane of movement, and a similar co-operating actuating member, substantially as described.

4. The combination, in a static meter, of a movable member or needle, a bifilar suspension of conducting material connecting one wire of a circuit to the needle, an actuating member in co-operative relation to the needle, and means for connecting the second wire of the circuit to the actuating member, substantially as described.

5. The combination, in a static meter, of a needle or movable member having vanes or extensions, a co-operating actuating body having co-operating vanes or extensions, the vanes on the two members being adapted to pass between or by each other, and a bifilar conducting suspension for the needle, substantially as described.

6. In a static meter, the combination of a needle or movable member, a bifilar suspension therefor, an actuating member in co-operative relation thereto, means for connecting the opposite wires of a circuit to the needle and to the actuating member respectively, and a regulating or retarding device for the needle, substantially as described.

7. A needle for static meters or other instruments, consisting of a plate or body and vanes extending from one side thereof and adapted to co-operate with corresponding vanes on an actuating device, substantially as described.

8. A needle, consisting of a plate or body and vanes extending from one side thereof and adapted to co-operate with corresponding vanes on an actuating device, in combination with a bifilar suspending device, substantially as described.

9. In a static meter, the combination of a needle or movable member, a bifilar suspension therefor, an actuating member in co-operative relation thereto, means for connecting the opposite wires of a circuit to the needle and to the actuating member respectively, and a retarding device for the needle, consisting of a fan movable with the needle, an inclosing vessel or chamber, and a partition at an angle to the fan and divided to allow movement thereof, substantially as described.

10. The combination, in a static meter with a needle or movable member suitably suspended and having segmental arc-shaped vanes, of a co-operating actuating device consisting of two connected segments between which the needle normally stands, substantially as described.

This specification signed and witnessed this 26th day of July, 1892.

A. E. KENNELLY.

Witnesses:
JOHN F. RANDOLPH,
HARRY F. MILLER.